United States Patent
Boland et al.

(10) Patent No.: US 6,209,062 B1
(45) Date of Patent: *Mar. 27, 2001

(54) METHOD FOR HOLDING CACHE PAGES THAT ARE NOT INVALIDATED WITHIN NORMAL TIME DURATION FOR A SECOND ACCESS OR THAT ARE LIKELY TO BE ACCESSED AGAIN SOON

(75) Inventors: Vernon K. Boland, Lexington; John H. Waters, Columbia, both of SC (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,876

(22) Filed: Nov. 24, 1997

(51) Int. Cl.[7] .................................................. G06F 12/10
(52) U.S. Cl. ........................ 711/134; 711/133; 711/154; 711/159
(58) Field of Search .................................. 711/122, 133, 711/134, 118, 117, 159, 163, 111, 3, 154, 160

(56) References Cited

U.S. PATENT DOCUMENTS

| | | | |
|---|---|---|---|
| 4,943,908 | * | 7/1990 | Emma et al. ........................ 712/240 |
| 5,442,571 | * | 8/1995 | Sites ....................................... 703/26 |
| 5,493,667 | * | 2/1996 | Huck et al. ........................... 711/125 |
| 5,539,893 | * | 7/1996 | Thompson et al. .................. 711/122 |
| 5,546,559 | | 8/1996 | Kyushima et al. . |
| 5,611,071 | * | 3/1997 | Martinez, Jr. ........................ 711/133 |
| 5,644,751 | * | 7/1997 | Burnett ................................. 711/113 |
| 5,754,820 | * | 5/1998 | Yamagami ........................... 711/133 |
| 5,941,980 | * | 8/1999 | Shang et al. ......................... 712/204 |
| 5,948,100 | * | 9/1999 | Hsu et al. ............................. 712/238 |
| 6,044,478 | * | 3/2000 | Green ..................................... 714/42 |
| 6,065,099 | * | 5/2000 | Clark et al. .......................... 711/133 |

* cited by examiner

Primary Examiner—Reginald G. Bragdon
Assistant Examiner—Christian P. Chace
(74) Attorney, Agent, or Firm—Blakely, Sokoloff, Taylor & Zafman LLP

(57) ABSTRACT

A memory management system and method that determines which page or pages in cache memory are likely to be accessed again in the near future by another transaction and designates those pages for recycling so that the pages are maintained in the cache memory for a longer period of time. That is, pages designated for recycling are maintained in the cache, while pages that are not are first replaced. According to the present application, pages in the cache that are likely to be accessed in the near future are those that are accessed by two or more different transactions during their normal residence in the cache.

6 Claims, 4 Drawing Sheets

FIGURE 2

METHOD FOR HOLDING CACHE PAGES THAT ARE NOT INVALIDATED WITHIN NORMAL TIME DURATION FOR A SECOND ACCESS OR THAT ARE LIKELY TO BE ACCESSED AGAIN SOON

BACKGROUND OF THE INVENTION

1. Field of the Invention

The present application relates to database management systems that implement buffer memory management processes to reduce main memory transaction times. More particularly the present application provides a cache memory management process that predicts pages in the memory that may be accessed in the near future and maintains the pages in the cache.

2. Description of the Related Art

Many database management systems use high speed buffer memory, known as buffer cache, to increase the speed of database transactions between a central processing unit (CPU) and disk storage and increase the overall speed of the data processing system. Typically, data is transferred from disk to main memory in pages or blocks of data. The data transferred typically includes data requested by the CPU and additional data, sometimes known as prefetched data, which is determined to be data that is most likely to be requested by the CPU soon.

Usually the total size of the database on disk is significantly larger than amount of memory available in the CPU system so that the cache eventually becomes full. As a result, the database management system has to decide which pages in the cache are to be removed and which are maintained.

Due to the temporal locality of database cache accesses, most pages that were accessed in the recent past are very likely to be accessed again the near future. Thus, conventional database management systems use a least recently used (LRU) memory management process, where the page least recently accessed is removed from the cache.

However, not all database cache pages have the same access characteristics. For example, some pages are frequently accessed over a long period of time, while other pages are accessed a number of times within a short period after the first access and then are not accessed again for a long time.

In multiple user environments more than one transaction may access some or all of the same pages in the cache. Thus, if the LRU memory management process is used in multiple user environments, pages may be replaced in the cache after one transaction has accessed the pages but before another transaction accesses some or all of the pages. In this instance, the CPU would then have to retrieve the pages from main memory again, thus increasing memory transaction times. For optimum performance of the cache, the page whose next access time is the farthest away in the future is the page that should be replaced.

SUMMARY OF THE INVENTION

The present application provides a memory management process that identifies a transaction that first accesses at least one page in cache memory, determines if a second transaction accesses the at least one page in the cache within a cache storage time, and maintains the at least one page in the cache for an extended period of time if the second transaction accesses the at least one page within the cache storage time. The cache storage time is the time a particular page would normally reside in the cache memory before it is replaced. The cache storage time may vary from page to page.

In an alternative embodiment, a method for managing cache memory allocation is provided. In this embodiment, a determination of which pages in the cache memory are most likely to be accessed again in the near future is made, and the pages determined to be accessed again in the near future are maintained in the cache for an extended period of time. Preferably, the determination of which pages are most likely to be accessed again in the near future is made by initially identifying a transaction that first accesses pages in the cache memory, and determining if a second transaction accesses the same page or some of the pages in the cache memory accessed previously during the period the page would normally reside in the cache before being replaced.

The present application also provides a memory management system that combines a least recently used memory management process with a page recycling technique to determine which pages in the cache are replaced. As noted above, the LRU memory management process replaces the least recently used page in the cache with a new page. However, pages in the cache that are assigned a recycle value for page recycling are maintained in the cache while those with no recycle value are first replaced.

BRIEF DESCRIPTION OF THE DRAWINGS

Preferred embodiments of the invention are described hereinbelow with reference to the drawing wherein:

FIG. 2 is a cache allocation table including an element for transaction identification information.

DETAILED DESCRIPTION OF THE PREFERRED EMBODIMENT

The present application provides a memory management system and method that determines which page or pages in cache memory are likely to be accessed again in the near future by another transaction and designates those pages for recycling. Pages designated for recycling are maintained in the cache, while pages that are not can be replaced.

According to the present application the determination of which page or pages in the cache are likely to be accessed in the near future incorporates the principle that pages in the cache that are accessed by two or more different transactions during their normal residence in the cache are more likely to be accessed again in the near future by new transactions than pages accessed by a single transaction during their residence in the cache. For example, in multiple user database systems with a work load that is characterized primarily by short running transactions, a first user can initiate a transaction that accesses a single page or multiple pages in the cache and then completes the transaction. After completion, that transaction does not access the page or pages again. Shortly thereafter, a second user initiates a different transaction that accesses some or all of the pages previously accessed by the first transaction. If these pages are replaced in the cache, then future transactions that access the pages will have to first retrieve the data from main memory.

The memory management system combines the LRU memory management process with a page recycling technique to determine which pages in the cache are replaced. As noted above, the LRU memory management process replaces the least recently used page in the cache with a new page. However, pages in the cache that are assigned a recycle value for page recycling are maintained in the cache while those with no recycle value or a recycle value of zero are first replaced.

Figure 1:
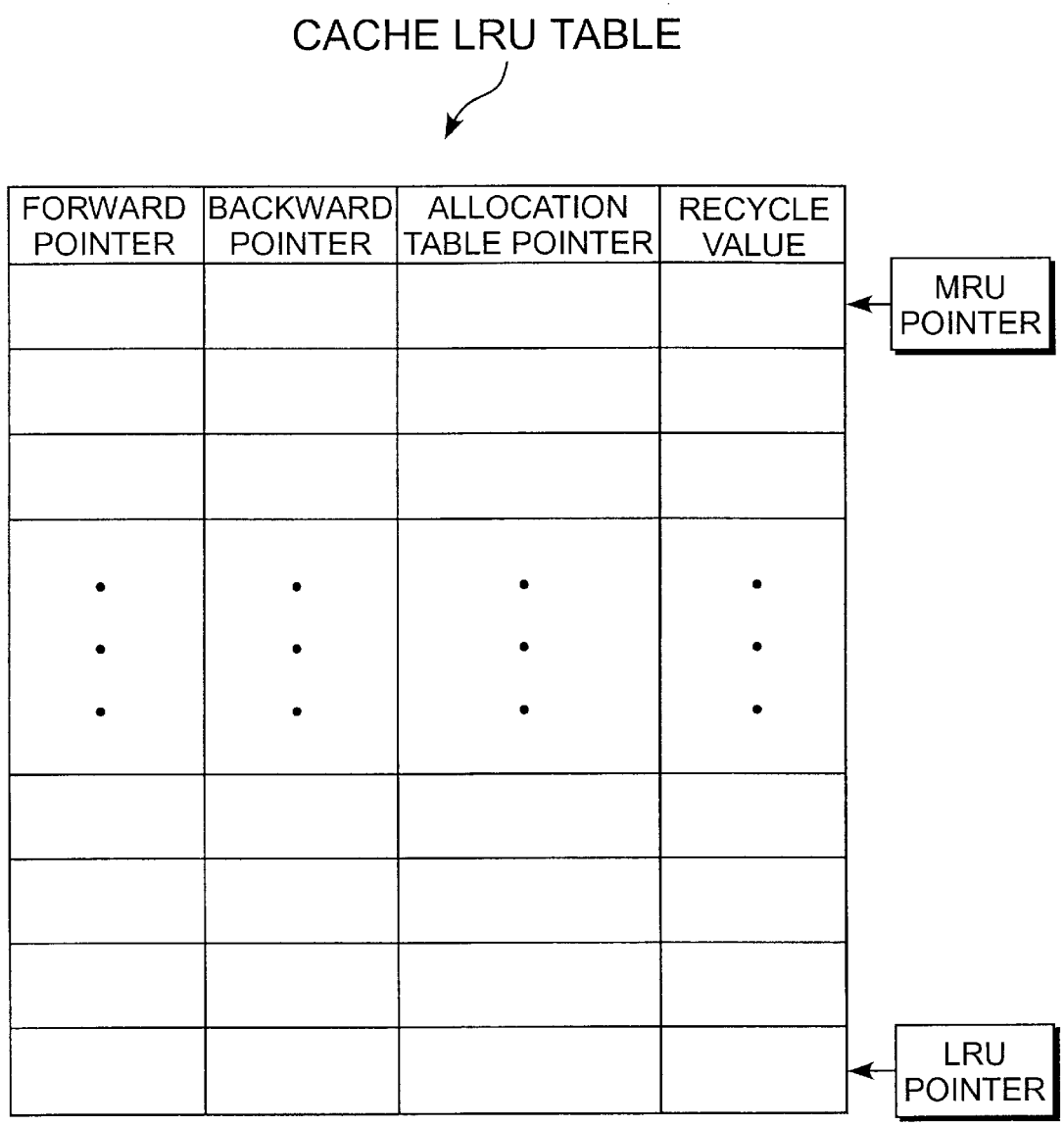
FIG. 1 is a cache LRU table having a recycle value element according to the present application.

FIG. 1 illustrates an exemplary cache LRU table that can be used to allocate or manage pages in the cache using the method of the present application. The cache LRU table operates similar to a push down stack so that new page reference information is added to the table at the most recently used end and previously existing page references in the table are pushed down toward the LRU end of the table. The cache LRU table includes page reference information for each page in the cache. For example, the page reference information may include forward and backward pointer elements that provide addresses to the next page entry, and a cache allocation pointer that cross-references pages in the cache allocation table with page references in the cache LRU table. A recycle element is provided and used to determine which pages in the cache are to be recycled.

Alternatively, time stamping can be used to allocate pages in the cache. For example, when a page is added to the cache the page can be time stamped and the pages with the oldest time stamp are replaced unless designated for recycling. If a page is designated for recycling, the time stamp is revised to reflect the time when the page is recycled.

Figure 2:
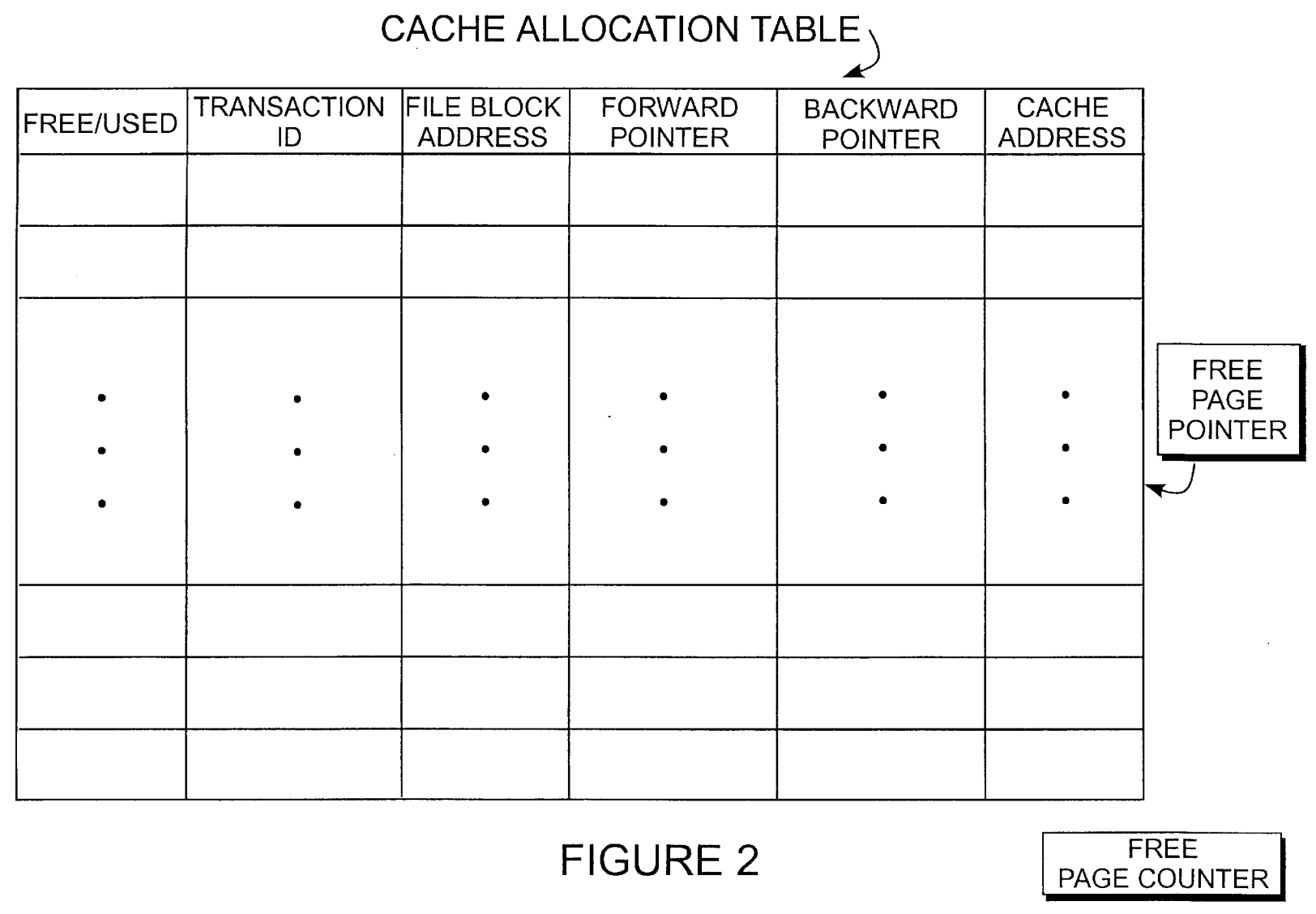

One embodiment for the memory management method according to the present application includes identifying each page in the cache with transaction identification information representing which transaction first accessed the page. Typically, a cache allocation table is used to manage data stored in the cache, and the transaction identification information can be added to the cache allocation table. FIG. 2 illustrates an example of a cache allocation table according to the present application. This exemplary table includes a free/used element which indicates whether a page in the cache is free or used. A file block element is used to indicate the addresses on disk where the data in the cache came from. Forward and backward pointer elements provide cache addresses for the next page entry, and a cache address element identifies the address for each page in the cache. A free page pointer provides the cache address of the first free page in the cache to be written to, and a free page counter that is continuously updated to provide a total number of free pages in the cache. To identify which transaction has first accessed the page, a transaction identification element is included in the table of FIG. 2. The transaction identification information may be, for example, a 32 bit field representing a process ID, providing the database is designed so that one process executes one transaction at a time.

Figure 3:
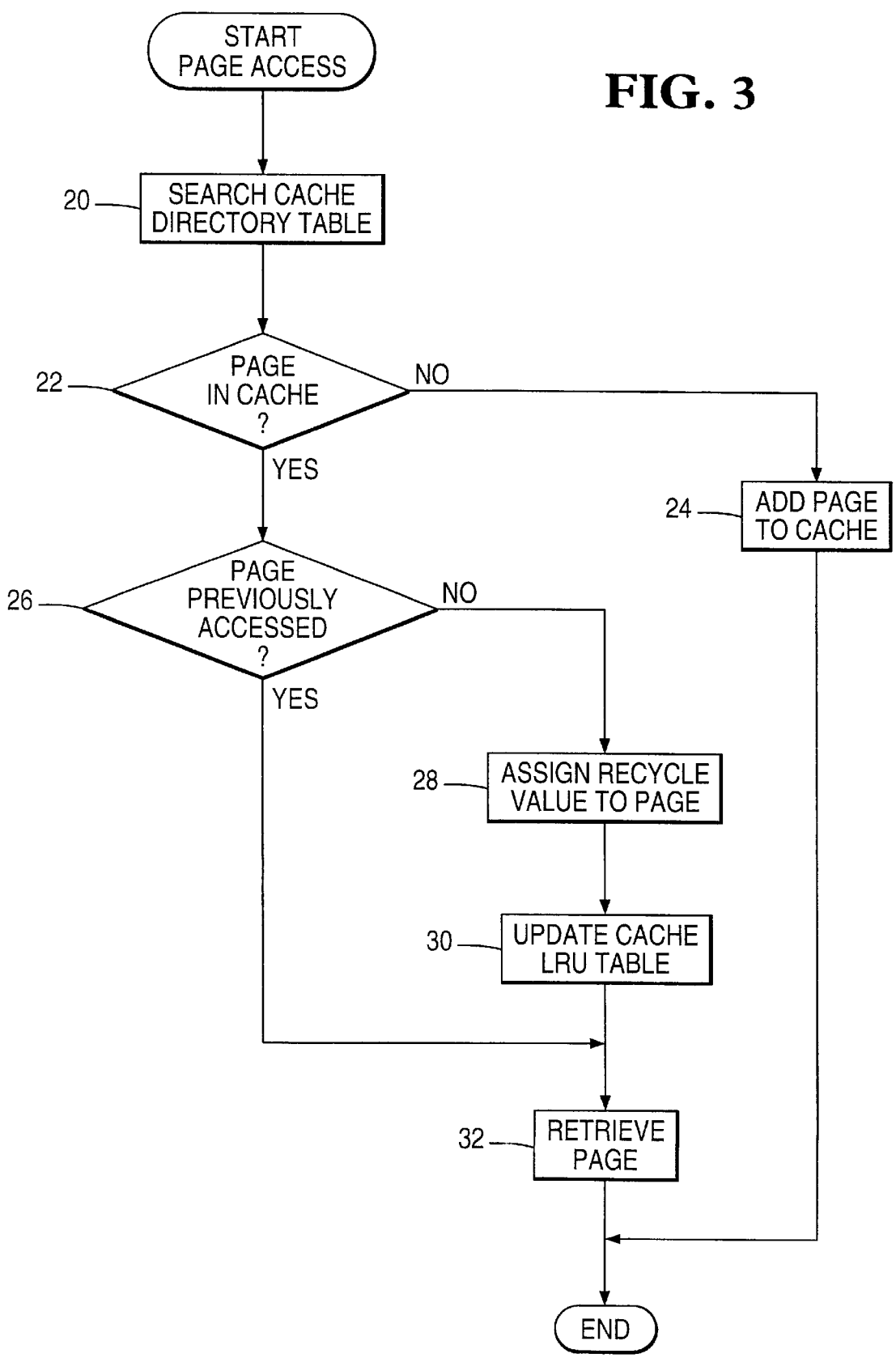
FIGS. 3 and 4 are flow diagrams for the memory management method according to the present application.
Figure 4:
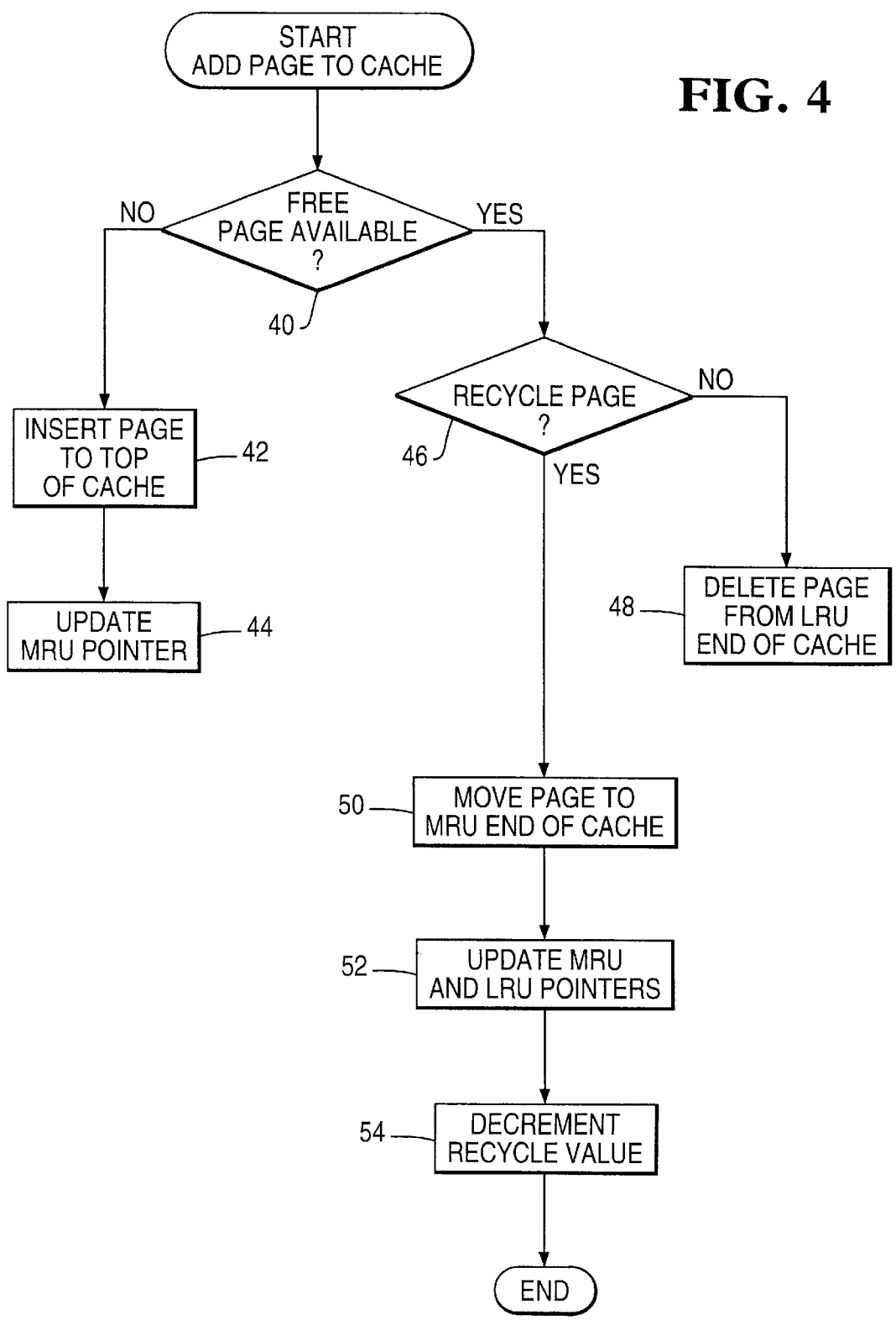

The method according to the present application will be described with reference to FIGS. 3 and 4. Referring to FIG. 3, initially, when data is being retrieved from memory, the memory management process will first search the cache allocation table to determine if the data sought is in the cache (step 20). As noted data is stored in the cache in pages. If the accessed page is in the cache at step 22, the memory management process determines whether or not the page was previously accessed (step 26). If the page has not been accessed, a recycle value is assigned to the page (step 28) and stored in the cache LRU table, seen in FIG. 1 (step 30). The recycle value assigned depends on various factors, such as the size of the buffer cache, the rate of which transactions are being processed (throughput), and the number of concurrent transactions being processed. The page (data) is then retrieved from the cache for subsequent processing (step 32).

If the page or pages are not in the cache in step 22, the page or pages are added to the cache (step 24). FIG. 4 provides a flow diagram for adding a page to the cache. To add a page, the memory management process first determines whether there is a free page in the cache by, for example, checking the free page counter of the cache directory table (step 40). If a page is available, the page is stored in the cache (step 42) and the most recently used (MRU) pointer in the cache LRU table (FIG. 1) is updated to the new page (step 44).

If in step 40 a free page in the cache is not available, then the memory management process has to replace one of the pages. As noted, the least recently used technique in combination with the recycling process is used to determine which page in the cache is to be replaced. More specifically, the memory management process looks to the cache LRU table and determines if the page identified by the LRU pointer is designated for recycling (step 46). If there is no recycle value in the cache LRU table or if the recycle value is zero, the page can be replaced and is deleted from memory, and the page reference is deleted from the least recently used end of the cache LRU table (step 48). If a recycle value is present, the page reference is moved from the least recently used end of the cache to the most recently used end of the cache (step 50) so that the most recently used and least recently used pointers are updated (step 52). After the page reference is moved, the recycle value associated with the page is decremented by 1 (step 54). In this embodiment, the page is recycled through the cache until the recycle value becomes zero. At this point the page can then be replaced when the LRU pointer in the cache LRU table points to the page.

It will be understood that various modifications can be made to the embodiments of the present invention herein without departing from the spirit and scope thereof. For example, various types of cache memory can be used. Moreover, the subject matter of the present invention may be applied to various multiple user database management systems. Therefore, the above description should not be construed as limiting the invention, but merely as preferred embodiments thereof. Those skilled in the art will envision other modifications within the scope and spirit of the invention as defined by the claims appended hereto.

For example, the same effect could be achieved by only promoting a page to the head of the LRU if it is accessed by multiple transactions. Thus, instead of favoring these pages with more trips to the head of the LRU, one could instead limit the other pages to no (or fewer) trips to the head of the LRU.

What is claimed is:

1. A method for managing allocation of pages of data in a cache memory, comprising:

identifying each process among a plurality of processes that accesses the cache memory and the page or pages of data accessed by that process;

assigning a recycle value comprising an integer value to a page or pages of data that is/are accessed by at least two different processes prior to said page or pages of data being replaced in the cache memory;

keeping an order tracking access of each page of data in the cache memory from a most recently used page at the top of the order to a least recently used page at the bottom of the order, each page of data in the memory cache being tracked by corresponding tracking indicia;

pointing the tracking indicia corresponding to said page or pages of data to the top of the order so as to indicate said page or pages of data is the most recently used page when said page or pages of data becomes the least recently used page and decrementing the recycle value assigned to said page or pages of data by one; and replacing said page or pages of data with a new page of data requesting access to the cache memory when said page or pages of data becomes the least recently used page and the recycle value is decremented to zero such that said page or pages of data are cycled from top to bottom through the order at least twice prior to being replaced in the cache.

2. The method of claim 1, further comprising replacing a least recently used page of data that has not been assigned a recycle value prior to any other page of data.

3. The method of claim 1, wherein keeping the order tracking access of each page of data is maintained by issuing a time stamp with each page as it is accessed in the cache memory.

4. The method of claim 1, further comprising implementing a data structure in software that tracks the order of access for each page of data along with a process identification for each access of the page of data.

5. The method of claim 4, wherein the data structure further comprises a plurality of pointers corresponding to the order that each page is accessed.

6. The method of claim 1, wherein the integer value is n and the page or pages of data are cycled from the top to the bottom of the order n+1 times prior to being replaced in the cache.

* * * * *